US009651950B2

(12) United States Patent
Jang et al.

(10) Patent No.: US 9,651,950 B2
(45) Date of Patent: May 16, 2017

(54) MISSION RE-PLANNING FOR COORDINATED MULTIVEHICLE TASK ALLOCATION

(75) Inventors: Jung Soon Jang, Bellevue, WA (US); Matthew A. Vavrina, Seattle, WA (US); John L. Vian, Renton, WA (US); Meng Hiot Lim, Singapore (SG); Caishun Chen, Singapore (SG)

(73) Assignee: The Boeing Company, Chicago, IL (US)

( * ) Notice: Subject to any disclaimer, the term of this patent is extended or adjusted under 35 U.S.C. 154(b) by 1337 days.

(21) Appl. No.: 13/551,616

(22) Filed: Jul. 18, 2012

(65) Prior Publication Data

US 2014/0025228 A1    Jan. 23, 2014

(51) Int. Cl.
| | |
|---|---|
| *G01D 1/00* | (2006.01) |
| *G05D 1/10* | (2006.01) |
| *G05D 1/02* | (2006.01) |
| *G06Q 10/04* | (2012.01) |
| *G05D 1/00* | (2006.01) |

(52) U.S. Cl.
CPC ........... *G05D 1/104* (2013.01); *G05D 1/0088* (2013.01); *G05D 1/027* (2013.01); *G06Q 10/047* (2013.01)

(58) Field of Classification Search
CPC .............................. G05D 1/0027; G05D 1/104
See application file for complete search history.

(56) References Cited

U.S. PATENT DOCUMENTS

| 7,451,023 B2* | 11/2008 | Appleby | G05D 1/0088 |
| | | | 701/120 |
| 7,469,183 B2* | 12/2008 | Bodin | G05D 1/0027 |
| | | | 701/23 |
| 7,512,462 B2* | 3/2009 | Nichols | G05D 1/101 |
| | | | 340/945 |
| 8,086,351 B2* | 12/2011 | Gaudiano | G01C 11/00 |
| | | | 700/245 |

(Continued)

OTHER PUBLICATIONS

B. Bethke, J. How, and J. Vian, "Multi-UAV Persistent Surveillance With Communication Constraints and Health Management," AIAA Guidance, Navigation and Control Conference, Aug. 2009.*

(Continued)

*Primary Examiner* — Thomas G Black
*Assistant Examiner* — Peter D Nolan
(74) *Attorney, Agent, or Firm* — McDonnell Boehnen Hulbert & Berghoff LLP

(57) ABSTRACT

A system and methods for mission re-planning are presented. Vehicles are monitored in real-time, and an incapacitated vehicle from among the vehicles that performs an incomplete task is detected. A remaining coverage set comprising a remaining coverage area for each of the vehicles is determined. A travel distance from a task completion location of each of the vehicles to a stopped point of the incapacitated vehicle is calculated to provide a travel set. An extra coverage set is determined based on the travel set and the remaining coverage set, and an incomplete coverage area for the incomplete task is calculated. The extra coverage set is compared to the incomplete coverage area and the remaining coverage area to provide a sufficiency list, and an assigned vehicle is selected from the vehicles based on the sufficiency list.

20 Claims, 5 Drawing Sheets

(56) References Cited

U.S. PATENT DOCUMENTS

| | | | | |
|---|---|---|---|---|
| 2005/0004723 A1* | 1/2005 | Duggan | ............... | G05D 1/0061 |
| | | | | 701/24 |
| 2006/0085106 A1* | 4/2006 | Gaudiano | ............... | G01C 11/00 |
| | | | | 701/23 |
| 2006/0106506 A1* | 5/2006 | Nichols | ................. | G05D 1/101 |
| | | | | 701/3 |
| 2007/0021880 A1* | 1/2007 | Appleby | ................ | G05D 1/104 |
| | | | | 701/23 |
| 2007/0233338 A1* | 10/2007 | Ariyur | ................ | G05D 1/0274 |
| | | | | 701/23 |
| 2008/0243372 A1* | 10/2008 | Bodin | ................ | G05D 1/0027 |
| | | | | 701/23 |
| 2009/0219393 A1 | 9/2009 | Vian et al. | | |
| 2010/0312388 A1 | 12/2010 | Jang et al. | | |
| 2013/0238170 A1* | 9/2013 | Klinger | ................ | G05D 1/104 |
| | | | | 701/3 |

OTHER PUBLICATIONS

EP13169024 Extended European Search Report of European Patent Office, Sep. 27, 2013.

\* cited by examiner

MISSION RE-PLANNING FOR COORDINATED MULTIVEHICLE TASK ALLOCATION

FIELD

Embodiments of the present disclosure relate generally to area search by a robotic vehicle. More particularly, embodiments of the present disclosure relate to real-time mission re-planning for coordinated multivehicle operation.

BACKGROUND

Many application environments for UAVs such as search and rescue, fauna surveys, border security, forest fire monitoring, and other applications, are challenging "incapacitation-prone" environments. Current search pattern methods do not account for real-time re-planning due to non-optimal operation of vehicles and changes in operating environments.

SUMMARY

A system and methods for mission re-planning are presented. Vehicles are monitored in real-time, and an incapacitated vehicle from among the vehicles that performs an incomplete task is detected. A remaining coverage set comprising a remaining coverage area for each of the vehicles is determined. A travel distance from a task completion location of each of the vehicles to a stopped point of the incapacitated vehicle is calculated to provide a travel set. An extra coverage set is determined based on the travel set and the remaining coverage set, and an incomplete coverage area for the incomplete task is calculated. The extra coverage set is compared to the incomplete coverage area and the remaining coverage area to provide a sufficiency list, and an assigned vehicle is selected from among the vehicles based on the sufficiency list.

Embodiments provide a heuristic based real-time re-planning system and methods that direct completion of uncompleted tasks of one or more unmanned air vehicles under non-optimal conditions such that uncompleted tasks can be covered by remaining vehicles. Embodiments are capable of scaling up for large-scale scenarios involving, for example, more than 400 unmanned air vehicles and a multitude of competing constraints among them without incurring significant computational burden.

In an embodiment, a system for mission re-planning comprises a status module, a required capability module, a sufficiency capability calculation module, and a selector module. The status module monitors a plurality of vehicles in real-time, and detects at least one incapacitated vehicle from among the vehicles that performs an incomplete task. The required capability module calculates an incomplete coverage area for the incomplete task. The sufficiency capability calculation module determines a remaining coverage set comprising a remaining coverage area for each of the vehicles. The sufficiency capability calculation module further calculates a travel distance from a task completion location of each of the vehicles to a stopped point of the at least one incapacitated vehicle to provide a travel set. The sufficiency capability calculation module further determines an extra coverage set based on the travel set and the remaining coverage set, and compares the extra coverage set to the incomplete coverage area and the remaining coverage area to provide a sufficiency list. The selector module assigns a selected vehicle from among the vehicles based on the sufficiency list.

In another embodiment, a method for mission re-planning monitors vehicles in real-time, and detects an incapacitated vehicle from among the vehicles that performs an incomplete task. The method further determines a remaining coverage set comprising a remaining coverage area for each of the vehicles. The method further calculates a travel distance from a task completion location of each of the vehicles to a stopped point of the at least one incapacitated vehicle to provide a travel set. The method further determines an extra coverage set based on the travel set and the remaining coverage set, and calculates an incomplete coverage area for the incomplete task. The method further compares the extra coverage set to the incomplete coverage area and the remaining coverage area to provide a sufficiency list, and assigns a selected vehicle from among the vehicles based on the sufficiency list.

In a further embodiment, a non-transitory computer readable storage medium comprises computer-executable instructions for mission re-planning. The method executed by the computer-executable instructions monitors vehicles in real-time and detects at least one incapacitated vehicle from among the vehicles that performs an incomplete task. The method executed by the computer-executable instructions further determines a remaining coverage set comprising a remaining coverage area for each of the vehicles. The method executed by the computer-executable instructions further calculates a travel distance from a task completion location of each of the vehicles to a stopped point of the at least one incapacitated vehicle to provide a travel set.

The method executed by the computer-executable instructions further determines an extra coverage set based on the travel set and the remaining coverage set, and calculates an incomplete coverage area for the incomplete task. The method executed by the computer-executable instructions further compares the extra coverage set to the incomplete coverage area and the remaining coverage area to provide a sufficiency list, and assigns a selected vehicle from among the vehicles based on the sufficiency list.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
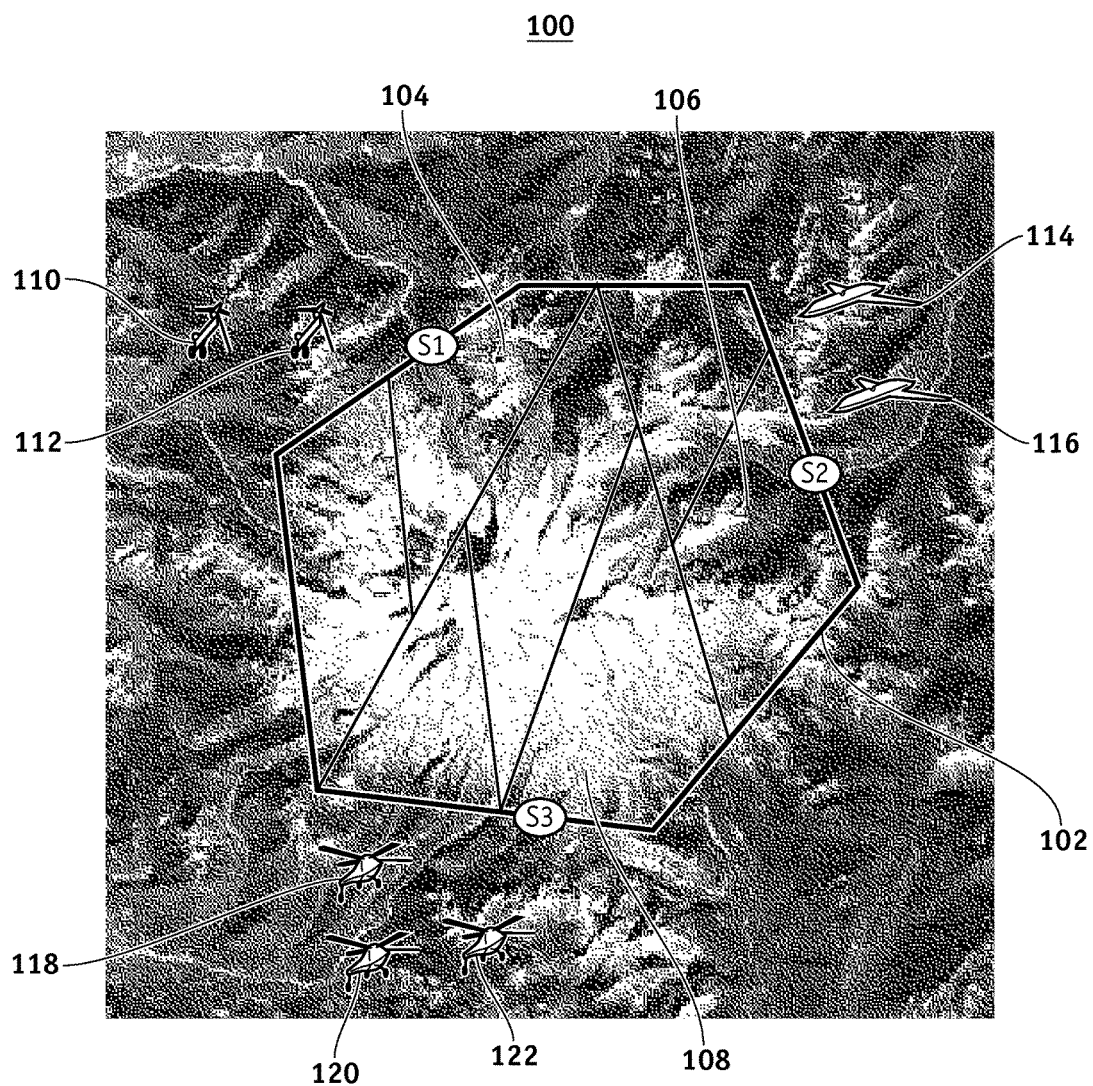
FIG. 1 is an illustration of an exemplary search region showing multiple vehicles with different capabilities searching a search region represented by a convex polygon according an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to, flight control systems, mathematical modeling, data communication, search and rescue techniques, aircraft operation, and other functional aspects of the systems (and the individual operating components of the systems) may not be described in detail herein. In addition, those skilled in the art will appreciate that embodiments of the present disclosure may be practiced in conjunction with a variety of different aircraft, control systems, search regions and search patterns, and that the system described herein is merely one example embodiment of the disclosure.

Embodiments of the disclosure are described herein in the context of a practical non-limiting application, namely, searching an area using unmanned aerial vehicles (UAVs). Embodiments of the disclosure, however, are not limited to such search operations, with UAVs, and the techniques described herein may also be utilized in other applications and other vehicles such as: an unmanned ground vehicles (UGVs) such as an automobile, an unmanned fluid vehicle (UFV) such as: a ship, a boat, and a submarine, a satellite, a robotic vehicle, an autonomous robotic vehicle, or other vehicle. For example, embodiments may be applicable to surveillance, fire suppression, tracking, combat, and other applications.

As would be apparent to one of ordinary skill in the art after reading this description, the following are examples, and embodiments of the disclosure are not limited to operating in accordance with these examples. Other embodiments may be utilized and structural changes may be made without departing from the scope of the exemplary embodiments of the present disclosure.

Many application environments for UAVs such as search and rescue, fauna surveys, boarder security, forest fire monitoring, and other applications, are challenging "incapacitation-prone" environments. Embodiments of the disclosure provide a system and methods for re-planning a UAV or a group of UAVs in an event that one or more UAV is incapacitated during its mission.

Embodiments provide a heuristic based re-planning system and methods that can handle a large number of UAVs and a multitude of competing constraints among them. For example, a re-planning algorithm computes higher power reserves based on and as a function of factors such as adjacency, heterogeneity, capability, and other constraint as explained in more detail below.

So when one UAV is incapacitated, the re-planning algorithm runs a tournament selection among all available UAVs to find and select a nearest, most available, and having higher power reserves, and assigns an incomplete task of an incapacitated UAV to a selected UAV. The re-planning algorithm re-plans and redistributes given tasks accordingly in real-time so that a search can be performed and completed with available assets (or remaining vehicles participating in a search). Embodiments of the disclosure scale up substantially easily for large-scale scenarios (i.e., more than 400 vehicles) without incurring significant computational expense.

In one embodiment, the method comprises a memetic algorithm that is applied during non-optimal conditions of robotic vehicles such as UAVs responding to performing a search. In a context of memetic computation, memetic algorithms (MAs) are techniques used for solving optimization problems. Memetic algorithms are evolutionary algorithms (EAs) that apply a local search process or method to refine individuals in a population. An objective of a memetic approach used herein is to minimize scanning time through polygon decomposition as a form of task division between UAVs and for each sub-polygon as explained in more detail below.

The term "re-planning" refers to a process of making adjustments to pre-established routes or flight paths that the UAVs are supposed to undertake. A need for re-planning arises due to an unexpected incapacitation of at least one UAV during mission execution. Incapacitation of at least one UAV can be caused by non-optimal operating conditions, operator deactivation of at least one UAV, or other phenomena. A goal may be to minimize time required to scan remaining polygonal divisions left behind by an incapacitated UAV. Computation of a revised plan should generally be completed within a substantially narrow time window.

The term real-time refers to a signal that is continuously being sent and received, with little or no time delay. The term near-real-time refers to a real-time signal with substantially no significant time delay. The time delay may be a delay introduced by, for example but without limitation, automated data processing or network transmission, between occurrence of an event, or other computational and transmission delay. In this document, the term real-time refers to both real-time and near-real-time.

Unmanned aerial vehicles (UAVs) are flexible and can be useful in surveillance, search and rescue tasks or even used for tracking and combat. UAVs equipped with a good image sensor can provide precise and real-time imagery to a ground control operator, who would then disseminate that information to facilitate decision-making. Additionally, some new UAVs such as the Predator™ used in recent wars in Afghanistan and Iraq can fly for more than 30 hours without having to refuel, compared with a helicopter's average flight time of just over two hours.

An ability of UAVs to loiter for a prolonged period of time has important operational advantages over manned aircraft. Longer flight time of UAVs mean that they can be used to handle difficult tasks such as searching for and rescuing people in an open sea, which generally require a prolonged time of operation. UAVs can be equipped with thermal detection sensors to detect humans hiding under a tree or a house, further extending deployment of the UAV for different application scenarios.

FIG. 1 is an illustration of an exemplary search region showing multiple vehicles of different capabilities searching a search region represented by a convex polygon 102. The UAVs are operable to be launched and operate from one or more fixed base locations. S1-S3 represent fixed base locations where UAVs are stationed prior to being deployed in a mission.

Each base S1-S3 may comprise a number of UAVs, and each UAV may comprise a variety of capabilities. Each UAV may comprise different speed, image sensor resolution (footprint) and flying endurance. A capability metric of a UAV may be defined as a total area the UAV can scan and may be computed based on a speed of the UAV, a flying endurance and a footprint as explained in more detail below.

A first step in an allocation process comprises dividing the convex polygon 102 into a number of pieces such that a sub-area assigned to each base S1-S3 is proportional to a total capability of each of the bases S1-S3. In the embodiment shown in FIG. 1, several kinds of UAVs are used for tasks. An overall capability of each of the bases S1-S3 is a sum of all UAV capabilities located at each of the bases S1-S3 respectively. For example, a total capability of the base S1 is a sum of capabilities of two UAVs 110-112, a total capability of the base S2 is a sum of capabilities of two UAVs 114-116, and a total capability of the base S3 is a sum of capabilities of three UAVs 118-122. After assigning each sub-area to each of the bases S1-S3, a memetic approach is used to find a best combination of UAVs to perform a scanning.

The memetic approach further partitions the sub-area assigned to each of the bases S1-S3 (Si, i=1,2,3), based on a capability of individual UAVs 110-122 stationed in a corresponding base (S1-S3) such that each UAV performs a unique search in a shortest search time. The memetic approach is described in commonly owned U.S. patent application Ser. No. 12/960,440, which is incorporated by reference herein in its entirety.

An algorithm as explained in more detail in the U.S. patent application Ser. No. 12/960,440 divides the searching polygon 102 and assigns each piece 104, 106, and 108 to each base S1-S3 respectively.

Base i comprises a capability denoted as $C_i$ which is a sum of capabilities of all UAVs in the base i and there are m bases on the polygon þ (102 in FIG. 1). The workspace is divided into m pieces (104, 106, and 108), and each piece 104/106/108 is assigned to one base S1/S2/S3 respectively. A solution is considered to be feasible if the following equation is satisfied:

$$Area(P_1):Area(P_2):\ldots:Area(P_m)=C_1:C_2:\ldots:C_m$$

Where an area of the part $P_i$ is $Area(P_i)$ whereby total area of all the parts $P_i$ should equal the area of the given polygon 102 based on the following area constraint:

$$\Sigma_{i=1}^{m} Area(P_i)=\text{Area of the polygon}$$

Embodiments of the disclosure provide a system and methods for re-planning at least one UAV among the UAVs 118-122 in an event that an individual UAV among the UAVs 118-122 is incapacitated during its mission as explained in more detail below.

Figure 2:
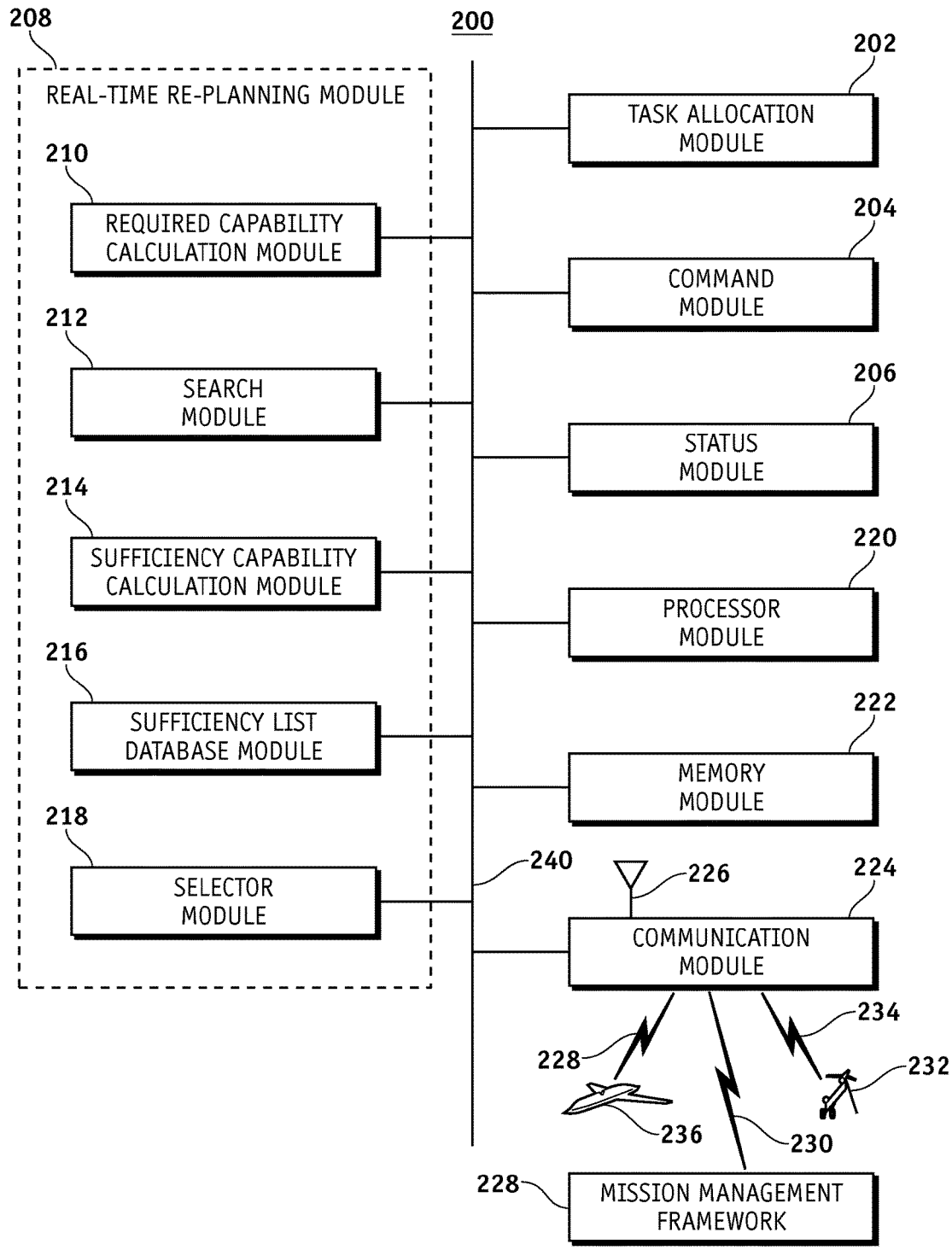
FIG. 2 is an illustration of an exemplary functional block diagram of a system for real-time re-planning of a mission of a vehicle according to an embodiment of the disclosure.

FIG. 2 is an illustration of an exemplary functional block diagram of a system 200 for real-time re-planning of a mission of a vehicle according to an embodiment of the disclosure. The various illustrative blocks, modules, processing logic, and circuits described in connection with system 200 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the real-time re-planning of a mission of a vehicle described herein.

The system 200 may be part of a network architecture that communicates with UAVs 232 and 236 or UAVs 118-122 in FIG. 1, or be a standalone portable device such as a mobile phone, a personal digital assistant (PDA) such as a Blackberry™ device, Palm Treo™, MP3 player, iPod™, iPad™, or other similar portable device. In some embodiments, the system 200 may be, for example but without limitation, a personal wireless computer such as a wireless notebook computer, a wireless palmtop computer, or other mobile computer device. The system 200 provides a real-time re-planning of a mission of multiple autonomous vehicles. The system 200 re-plans and redistributes given tasks accordingly in real-time allowing remaining vehicles participating in a search to complete an incomplete task of an incapacitated UAV.

The system 200 may comprise a task allocation module 202, a command module 204, a status module 206, a real-time re-planning module 208, a processor module 220, a memory module 222, and a communication module 224.

The task allocation module 202 is configured to allocate a plurality of tasks to the UAVs 232 and 236 (similar to UAVs 110-122 in FIG. 1) respectively.

The command module 204 is configured to command the tasks allocated to each of the UAVs 232 and 236. The command module 204 commands the UAVs 232 and 236 for deployment via the communication module 224. In this manner, the communication module 224 may serve as a communication bridge between the system 200 and a mission management framework 228. For example but without limitation, the communication module 224 may use a wireless data communication link 230, and an internet socket (not shown) to provide the communication bridge. Mission series points are then processed by the mission management framework 228 to control all UAVs 232 and 236 to follow mission series points. The mission series points may comprise, for example but without limitation, a series of waypoints for each of the UAVs 232 and 236 that each of the UAVs 232 and 236 would follow to perform a task such as an area search.

The status module 206 is configured to monitor the UAVs 232 and 236 in real-time and to detect at least one incapacitated UAV from the UAVs 232 and 236 that performs an incomplete task. A health management logic (not shown) onboard each UAV 232/236 monitors a status of the UAVs 232/236 and sends a data packet corresponding to the status to the communication module 224. The communication module 224 checks a validity of the data packet (i.e., by using CheckSUM, cyclic redundancy check (CRC), or other error correction method) and passes the data packet to the status module 206. Then the status module 206 may decode the data packet to check if any of the UAVs 232/236 is incapacitated.

The real-time re-planning module 208 is configured to assign at least one active UAV from among the UAVs 232/236 and UAVs 110-122 to complete the incomplete task based on a sufficiency list. For example, the real-time re-planning module 208 may select at least one active UAV from the 232/236 and UAVs 110-122 that is nearest, most available, and has higher power reserves to complete the incomplete task. The real-time re-planning module 208 may comprise a required capability calculation module 210 (required capability module 210), a search module 212, a sufficiency capability calculation module 214, a sufficiency list database module 216, and a selector module 218.

As explained above, the real-time re-planning module 208 is configured to handle a large number of UAVs and a multitude of competing constraints among them. For example, the real-time re-planning module 208 computes higher power reserves based on and as a function of factors such as adjacency, heterogeneity, capability, and/or other constraint.

The real-time re-planning module 208 takes into account an adjacency between UAVs 232, 236 and 110-122 for computing higher energy servers. Thus, when one UAV is incapacitated, the real-time re-planning module 208 runs a tournament selection among all available UAVs to find a nearest, most available, and having higher power reserves, and assigns the incomplete task of the incapacitated UAV to the selected UAV. The real-time re-planning module 208 then re-plans and redistributes given tasks accordingly in real-time so that the search can be performed and completed with available assets (or remaining vehicles participating in a search).

The real-time re-planning module 208 takes into account heterogeneity because UAVs 232, 236 and 110-122 participating in a mission, namely a search, are not necessarily homogeneous and may comprise, for example but without limitation, an airplane, a helicopter, or other vehicle. Thus, in a non-homogenous scenario adjacency may not mean higher energy reserves. Because, an airplane may get to a stopped point faster and with less energy than an adjacent helicopter.

The real-time re-planning module 208 takes into account capability because a sensor suite carried by UAVs such as UAVs 232/236 and UAVs 110-122 may have a different capability, for example, a different sensor footprint. If an adjacent UAV has a smaller sensor footprint than a UAV further away, a search grid of the adjacent UAV would be finer, which means the adjacent UAV may travel more to cover the search area.

The required capability calculation module 210 is configured to calculate an incomplete coverage area for the incomplete task. A capability metric is calculated based on vehicle asset such as, but without limitation, sensor footprint, speed, endurance, fuel, and other asset. As mentioned above, each base (S1-S3 in FIG. 1) comprises a number of UAVs from the UAVs 232, 236 and 110-122 with different capability. Each UAV from the UAVs 232, 236 and 110-122 may have different speed, image sensor resolution (footprint/sensor footprint) and flying endurance. The capability metric of a UAV may be defined as a total area the UAV can scan and computed by multiplication of the speed, flying endurance (maximum flying time) and footprint. For example a UAV capability may be determined based on the following relationship:

$$UAV\ capability=footprint*speed*endurance$$

Thus, the required capability calculation module 210 can determine a capability required (remainArea) to handle the incomplete task of the incapacitated UAV as follows:

$$remainArea\ (meter^2)=footprint\ (meters)*speed\ (meters/second)*endurance\ (seconds).$$

The search module 212 is configured to search for active UAVs from among the UAVs 232, 236 and 110-122. The search module 212 may search for the active UAVs based on data received from the communication module 224 as explained below.

The sufficiency capability calculation module 214 is operable to provide a sufficiency list comprising a list of the active UAVs from the UAVs 232, 236 and 110-122 with a required capability to complete the incomplete task of the incapacitated UAV. The required capability is characterized by the incomplete coverage area (remainArea). In this manner, the sufficiency capability calculation module 214 determines a remaining coverage set (k.leftArea) characterizing an un-scanned area of each of the UAVs 232, 236 and 110-122, and calculates a travel distance (getAdjacency (point, endpoint(k))) from a task completion location endpoint(k) of each of the UAVs 232, 236 and 110-122 to a stopped point (point) of the incapacitated vehicle to provide a travel set (Adjacency(k)=getAdjacency(point, endpoint (k))).

The sufficiency capability calculation module 214 then determines an extra coverage set (Extravalue(k)) based on a travel set (Adjacency(k)) scaled by the footprint) and the remaining coverage set (k.leftArea) using the following relationship:

$$Extravalue(k) =Adjacency(k)*footprint +k.leftArea$$

(Adjacency(k)*footprint) having a unit of area and Adjacency(k) having a unit of distance may be used interchangeably as a travel set.

The travel set (Adjacency(k)*footprint) is an area that each UAV needs to travel to reach the endpoint(k) to start covering the incomplete coverage area (remainArea) of the incapacitated UAV. The remaining coverage set (k.leftArea) is an un-scanned area of each of the UAVs from the UAVs 232, 236 and 110-122. Thus, extra coverage set (Extravalue (k)) determines how much area coverage or capability each of the UAVs from the UAVs 232, 236 and 110-122 may need to complete scanning their own un-scanned area (k.leftArea) plus a capability (Adjacency(k)*footprint) to reach the endpoint(k). The sufficiency capability calculation module 214 then compares the extra coverage set Extravalue(k) to the incomplete coverage area (remainArea) and the remaining coverage area (k.power) for each of the UAVs 232, 236 and 110-122 based on the following relationship to provide a sufficiency list:

$$If((k.power-remainArea-Extravalue(k))>0),$$

where remainArea is the incomplete coverage area characterizing the capability required to handle incomplete task of incapacitated UAV, k.power is the remaining coverage area characterizing the remaining capability of each of the UAVs, and k is an integer greater than or equal to 1 indicating a particular UAV, Extravalue(k) characterizes capability of each of the UAVs needed to complete scanning their own assigned area plus the capability needed to reach the endpoint(k).

If k.power exceeds the sum of remainArea and Extravalue (k) then the UAV(k) is selected as a candidate available active UAV to complete the incomplete task of the incapacitated UAV.

The sufficiency list database module 216 comprises the sufficiency list which comprises available active UAVs to complete the incomplete task of the incapacitated UAV.

The selector module 218 is configured to select at least one of the available active UAVs from the UAVs 110-122 from the sufficiency list to complete the incomplete task based on various constraints. For example but without limitation, the selector module 218 assigns a selected UAV to complete the incomplete task of the incapacitated UAV based on, for example, minimizing a time to complete the incomplete coverage area, minimizing a time to complete the incomplete coverage area and the remaining coverage set, minimizing a fuel consumption to complete the incomplete coverage area, or other constraints.

The processor module 220 comprises processing logic that is configured to carry out the functions, techniques, and processing tasks associated with the operation of the system 200. In particular, the processing logic is configured to support the searching function of the system 200 described herein. For example, but without limitation, the processor module 220 may be suitably configured to perform a memetic algorithm, direct the status module 206 to monitor and the UAVs 110-122 in real-time and detect at least one incapacitated UAV from the UAVs 110-122 that performs an incomplete task, and direct the required capability calculation module 210 to calculate an incomplete coverage area for the incomplete task. For another example, but without limitation, the processor module 220 may be suitably configured to direct the sufficiency capability calculation module 214 to provide the sufficiency list, direct the selector module to select at least one of the available active vehicles from the sufficiency list, direct the memory module 222 to store the sufficiency list in the sufficiency list database module 216 therein, and direct and/or perform other function of the system 200.

The processor module 220 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 222 may be any suitable data storage area with suitable amount of memory that is formatted to support the operation of the system 200. The memory module 222 is configured to store, maintain, and provide data as needed to support the functionality of the system 200 in the manner described below. In practical embodiments, the memory module 222 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory module 222 may be coupled to the processor module 220 and configured to store, for example but without limitation, the input parameter values and the output parameter values corresponding to the a search scenario.

The memory module 222 may store, for example but without limitation, vehicle capability (e.g., coverage area), vehicle performance parameters (e.g., speed, turn rate, etc.), scanning pattern, scan time, vehicles operating expenses (e.g., fuel cost), the sufficiency list database module 216, and other data. Additionally, the memory module 222 may represent, for example but without limitation, a dynamically updating database comprising a table for a purpose of storing search pattern waypoints, UAVs capabilities, or other data. The memory module 222 may also store, for example but without limitation, a computer program that is executed by the processor module 220, an operating system, an application program, tentative data used in executing a program processing, or other program or data.

The memory module 222 may be coupled to the processor module 220 such that the processor module 220 can read information from and write information to the memory module 222. As an example, the processor module 220 and memory module 222 may reside in their respective ASICs. The memory module 222 may also be integrated into the processor module 220. In an embodiment, the memory module 222 may comprise a cache memory for storing temporary variables or other intermediate information during execution of instructions to be executed by the processor module 220.

The communication module 224 manages communication network among UAVs 232 and 236 (similar to UAVs 110-122 in FIG. 1). The communication module 224 transmits and receives data from and to the UAVs 232 and 236 via the wireless data communication link 234 and 238 respectively. The communication module 224 may comprise a transmitter module (not shown) and a receiver module (not shown), and may be coupled to an RF antenna arrangement 226 that can support a particular wireless communication protocol and modulation scheme to communicate with the UAVs 232 and 236.

The communication module 224 is configured to pass a data packet corresponding to each of the UAVs 232 and 236 to the status module 206. For example, as explained above, a health management logic (not shown) onboard each UAV 232 and 236 monitors status of each UAV 232 and 236 and sends a corresponding data packet to the communication module 224. The communication module 224 checks the validity of the data packet (i.e., by using CheckSUM, CRC, or other error correction method) and passes the data packet to the status module 206. Then, the status module 206 may decode the data packet to check if any of the UAVs 232 and 236 is incapacitated.

The communication module 224 receives each UAV's remaining flight capability, such as but without limitation, remaining fuel, flight time, health condition such as degradation and non-optimal performance affecting each UAVs capability, status (e.g., incapacitated or operating), and other data. The communication module 224 is communicatively coupled to the mission management framework 228 and is configured to transmit such information to the mission management framework 228 via the wireless data communication link 230. The mission management framework 228 is configured to perform re-planning provided by the real-time re-planning module 208 to accommodate unaccounted events in real-time, thus maintaining a search task.

Figure 3:
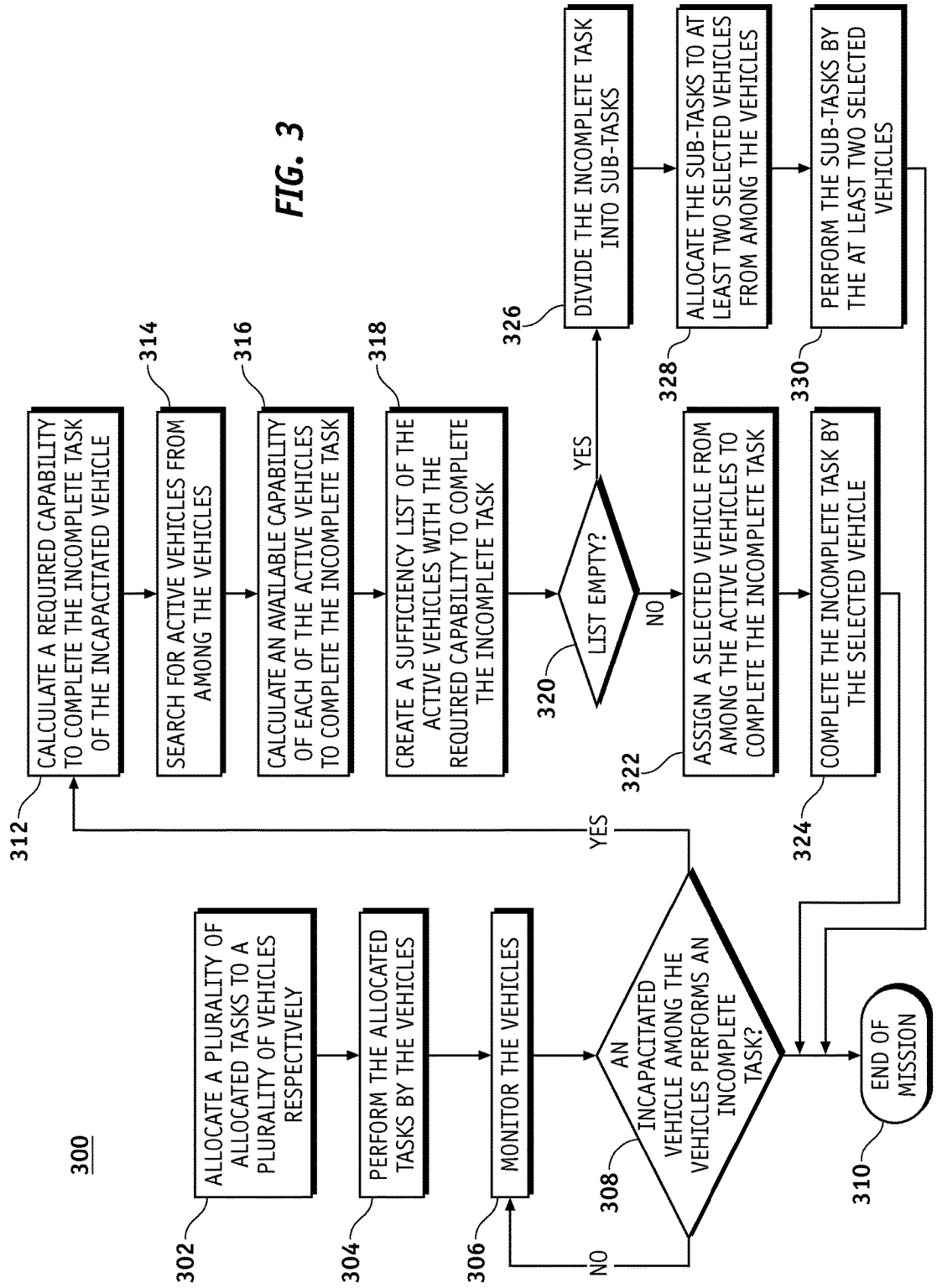
FIG. 3 is an illustration of a flowchart showing a process for real-time re-planning of a mission of a vehicle according to an embodiment of the disclosure.

FIG. 3 is an illustration of a flowchart showing a process 300 for re-planning a mission of a vehicle according to an embodiment of the disclosure. The various tasks performed in connection with the process 300 may be performed, by software, hardware, firmware, a computer-readable medium having computer executable instructions for performing the process method, or any combination thereof. The process 300 may be recorded in a computer-readable medium such as a semiconductor memory, a magnetic disk, an optical disk, and the like, and can be accessed and executed, for example, by a computer CPU such as the processor module 220 in which the computer-readable medium is stored.

It should be appreciated that the process 300 may include any number of additional or alternative tasks, the tasks shown in FIG. 3 need not be performed in the illustrated order, and process 300 may be incorporated into a more comprehensive procedure or process having additional functionality not described in detail herein. For illustrative purposes, the following description of the process 300 may refer to elements mentioned above in connection with FIGS. 1-2.

In practical embodiments, portions of the process 300 may be performed by different elements of the system 200 such as: the task allocation module 202, the command module 204, the status module 206, the real-time re-planning module 208, the processor module 220, the memory module 222, the communication module, etc. Process 300 may have functions, material, and structures that are similar to the embodiments shown in FIGS. 1-2. Therefore common features, functions, and elements may not be redundantly described here.

Process 300 may begin by a task allocation module such as the task allocation module 202 allocating a plurality of allocated tasks to a plurality of vehicles such as the UAVs 232 and 236 respectively (task 302).

Process 300 may continue by performing the allocated tasks by the vehicles (task 304).

Process 300 may continue by a status module such as the status module 206 monitoring the vehicles (task 306).

Process 300 may continue by the status module 206 determining whether an incapacitated vehicle among the vehicles performs an incomplete task (inquiry task 308). If the incomplete task is not performed by the incapacitated vehicle (NO branch of inquiry task 308) then process 300 may go to task 306. Otherwise (YES branch of inquiry task 308) process 300 may continue by calculating a required capability to complete the incomplete task of the incapacitated vehicle (task 312).

Process 300 may continue by a search module 212 such as the search module 212 searching for active vehicles from among the vehicles (task 314).

Process 300 may continue by a sufficiency capability calculation module such as the sufficiency capability calculation module 214 calculating an available capability of each of the active vehicles to complete the incomplete task (task 316). The available capability is further explained in the context of task 408 of process 400 below.

Process 300 may continue by the sufficiency capability calculation module 214 creating a sufficiency list of the active vehicles with the required capability to complete the incomplete task (task 318).

Process 300 may continue by a processor module such as the processor module 220 determining whether the sufficiency list is empty (inquire task 320).

If the sufficiency list is not empty (NO branch of inquiry task 320) process 300 may continue by assigning a selected vehicle from among the active vehicles to complete the incomplete task (task 322).

Process 300 may continue by completing the incomplete task by the selected vehicle (task 324) and go to end of mission (task 310).

If the sufficiency list is empty (YES branch of inquiry task 320) process 300 may continue by dividing the incomplete task into sub-tasks (task 326).

Process 300 may continue by the task allocation module 202 allocating the sub-tasks to at least two selected vehicles from among the vehicles (task 328).

Process 300 may continue by performing the sub-tasks by the at least two selected vehicles (task 330) and go to end of mission (task 310).

Figure 4:
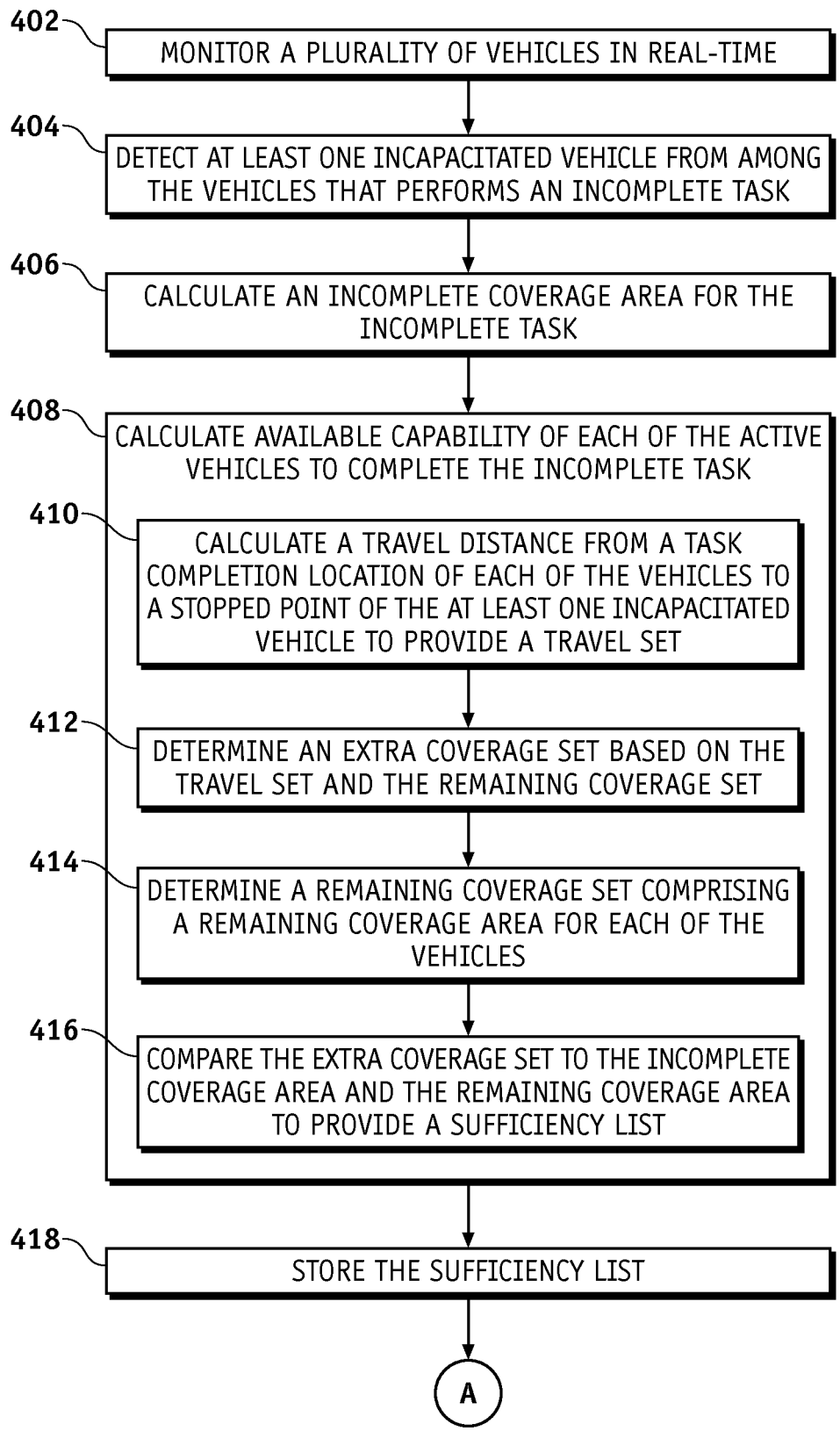
FIG. 4 is an illustration of a flowchart showing a process for re-planning a mission of a vehicle according to an embodiment of the disclosure.
Figure 4:
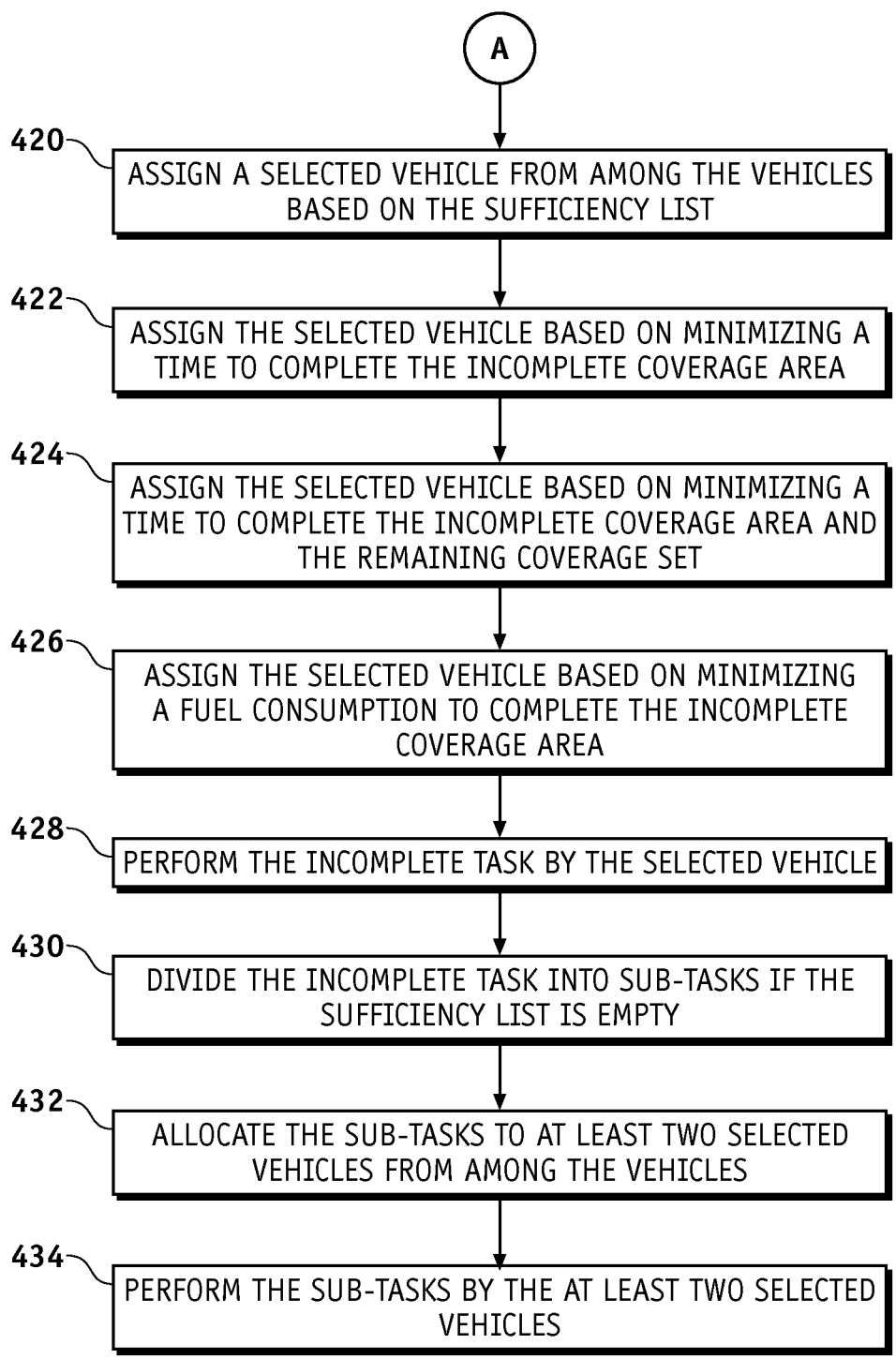

FIG. 4 is an illustration of a flowchart showing a process 400 for re-planning a mission of a vehicle according to an embodiment of the disclosure. The various tasks performed in connection with the process 400 may be performed, by software, hardware, firmware, a computer-readable medium having computer executable instructions for performing the process method, or any combination thereof. The process 400 may be recorded in a computer-readable medium such as a semiconductor memory, a magnetic disk, an optical disk, and other non-transitory medium, and can be accessed and executed, for example, by a computer CPU such as the processor module 220 in which the computer-readable medium is stored.

It should be appreciated that the process 400 may include any number of additional or alternative tasks, the tasks shown in FIG. 4 need not be performed in the illustrated order, and process 400 may be incorporated into a more comprehensive procedure or process having additional functionality not described in detail herein. For illustrative purposes, the following description of the process 400 may refer to elements mentioned above in connection with FIGS. 1-2.

In practical embodiments, portions of the process 400 may be performed by different elements of the system 200 such as: the task allocation module 202, the command module 204, the status module 206, the real-time re-planning module 208, the processor module 220, the memory module 222, the communication module, etc. Process 400 may have functions, material, and structures that are similar to the embodiments shown in FIGS. 1-2. Therefore common features, functions, and elements may not be redundantly described here.

Process 400 may begin by a status module such as the status module 206 monitoring a plurality of vehicles such as the UAVs 232 and 236 in real-time (task 402).

Process 400 may continue by the status module 206 detecting at least one incapacitated vehicle from among the vehicles that performs an incomplete task (task 404). For example, the real-time re-planning module 208 receives an event indicating that UAVk has incapacitated without completing its scanning task. At this point, the real-time re-planning module 208 executes a tournament selection process in which UAVr finishing its task and has sufficient capability is chosen to handle the remaining area left behind (remainArea) due to the incapacitation of UAVk. Subsequently, a rerouting procedure directs UAVr to fly to the location of the incapacitated UAVk and continues with UAVk's incomplete task. Where, k and r are each an integer greater than or equal to 1, each indicating a different particular UAV.

Process 400 may continue by calculating an incomplete coverage area (remainArea) for the incomplete task (task 406). The incomplete coverage area (remainArea) comprises the required capability to complete the incomplete task of the incapacitated UAV.

Process 400 may continue by calculating available capability of each of the vehicles to complete the incomplete task (task 408) as described in the tasks 410-416 below. The real-time re-planning module 208 may handle a large number of UAVs and a multitude of competing constraints among them. For example, the re-planning algorithm takes into account the adjacency (Adjacency(k)) between UAVs. So when one UAV is incapacitated, the real-time re-planning module 208 runs a tournament selection among all available UAVs to find the nearest, most available, and having higher power reserves, and assigns the new task to the selected UAV.

Process 400 may continue by a sufficiency capability calculation module such as the sufficiency capability calculation module 214 calculating a travel distance from a task completion location of each of the vehicles to a stopped point of the at least one incapacitated vehicle to provide a travel set (Adjacency(k)* footprint)) (task 410).

Process 400 may continue by the sufficiency capability calculation module 214 determining an extra coverage set Extravalue(k) based on the travel set and the remaining coverage set (Extravalue(k) =Adjacency(k)*footprint +k.leftArea) (task 412).

Process 400 may continue by the sufficiency capability calculation module 214 determining a remaining coverage set (k.leftArea) comprising a remaining coverage area for each of the vehicles (task 414).

Process 400 may continue by the sufficiency capability calculation module 214 comparing the extra coverage set (Extravalue(k)) to the incomplete coverage area (remainArea) and the remaining coverage area (k.power) to provide a sufficiency list (task 416).

Process 400 may continue by a sufficiency list database module such as the sufficiency list database module 216 storing the sufficiency list (task 418).

Process 400 may continue by assigning a selected vehicle from the vehicles based on the sufficiency list (task 420).

Process 400 may continue by a selector module 218 such as the selector module 218 assigning the selected vehicle based on minimizing a time to complete the incomplete coverage area (remainArea) (task 422). The time can, for example, be minimized by selecting a UAV with minimum Adjacency(k), maximum speed, and/or a large foot print. For example, if an adjacent UAV has a smaller sensor footprint than a UAV further away, a search grid of the adjacent UAV would be finer, which means it may travel more to cover the area. So to minimize the time, the further UAV may be selected.

Process 400 may continue by assigning the selected vehicle based on minimizing a time to complete the incomplete coverage area (remainArea) and the remaining coverage set (k.leftArea) (task 424).

Process 400 may continue by the selector module 218 assigning the selected vehicle based on minimizing a fuel consumption to complete the incomplete coverage area (task 426). The fuel can, for example, be minimized by selecting a UAV with minimum fuel burn capability.

Process 400 may continue by performing the incomplete task by the selected vehicle (428). Process 400 may continue by dividing the incomplete task into sub-tasks if the sufficiency list is empty (430). During the real-time re-planning, there may be cases in which no UAV has remaining capability to handle the remaining area of the incapacitated UAV. In this case, a particular remaining area may be divided among a set of active UAVs that should cooperatively scan the area. On the other hand, the real-time re-planning module 208 does not know a shape of the remaining area left by a particular incapacitated UAV; the real-time re-planning module 208 knows a remaining series of points. In this case, the real-time re-planning module 208 divides the remaining series of points into two parts and allocates each part to at least one UAV.

Process 400 may continue by the selector module 218 allocating the sub-tasks to at least two selected vehicles from among the vehicles (task 432).

Process 400 may continue by performing the sub-tasks by the at least two vehicles (task 434).

In this way, embodiments of the disclosure provide a heuristic based re-planning algorithm enabling remaining vehicles to cover uncompleted tasks of an incapacitated vehicle by using the real-time re-planning system. A memetic task allocation algorithm that reduces search time may be used to generate an area search method covered by multiple unmanned vehicles, by taking into account their different sensing and range capabilities and base locations. Embodiments are capable of scaling up for large-scale scenarios involving, for example, more than 400 unmanned vehicles without incurring significant computational burden.

When implemented in software or firmware, various elements of the system 200 such as the task allocation module 202, the command module 204, the status module 206, the real-time re-planning module 208, and the communication module 224 described herein are essentially the code segments or instructions that perform the various tasks. The program or code segments can be stored in non-transitory medium such as a processor-readable medium or transmitted by a computer data signal embodied in a carrier wave over a transmission medium or communication path.

The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, an RF link, or other non-transitory medium.

In this document, the terms "computer program product", "computer-readable medium", and the like may be used generally to refer to media such as, for example, memory, storage devices, storage unit, or other non-transitory media. These and other forms of computer-readable media may be involved in storing one or more instructions for use by the processor module 220 to cause the processor module 220 to perform specified operations. Such instructions, generally referred to as "computer program code" or "program code" (which may be grouped in the form of computer programs or other groupings), when executed, enable a method of using a system such as the system 200.

Those skilled in the art will understand that the various illustrative blocks, modules, circuits, and processing logic described in connection with the embodiments such as system 200 disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A system for mission re-planning, the system comprising:
   a status module operable to:
   monitor a plurality of vehicles in real-time; and
   detect at least one incapacitated vehicle from among the vehicles that performs an incomplete task;
   a required capability module operable to calculate an incomplete coverage area for the incomplete task;
   a sufficiency capability calculation module operable to:
   determine a remaining coverage set comprising a remaining coverage area for each of the vehicles;
   calculate a travel distance from a task completion location of each of the vehicles to a stopped point of the at least one incapacitated vehicle to provide a travel set;
   determine an extra coverage set based on the travel set and the remaining coverage set; and
   compare the extra coverage set to the incomplete coverage area and the remaining coverage area to provide a sufficiency list; and
   a selector module operable to assign a selected vehicle from among the vehicles based on the sufficiency list.

2. The system of claim 1, wherein the selector module is further operable to assign the selected vehicle based on minimizing a time to complete the incomplete coverage area.

3. The system of claim 1, wherein the selector module is further operable to assign the selected vehicle based on minimizing a time to complete the incomplete coverage area and the remaining coverage set.

4. The system of claim 1, wherein the selector module is further operable to assign the selected vehicle based on minimizing a fuel consumption to complete the incomplete coverage area.

5. The system of claim 1, further comprising a sufficiency list database module operable to store the sufficiency list in a sufficiency list database module.

6. The system of claim 1, wherein the vehicles comprise aerial vehicles, and ground vehicles.

7. The system of claim 1, wherein the status module is further operable to determine a status of each of the vehicles by decoding a corresponding data packet received from a communication module.

8. A method for mission re-planning, the method performed by action of a processor comprising:
   monitoring a plurality of vehicles in real-time;
   detecting at least one incapacitated vehicle from among the vehicles that performs an incomplete task;
   determining a remaining coverage set comprising a remaining coverage area for each of the vehicles;
   calculating a travel distance from a task completion location of each of the vehicles to a stopped point of the at least one incapacitated vehicle to provide a travel set;
   determining an extra coverage set based on the travel set and the remaining coverage set;
   calculating an incomplete coverage area for the incomplete task;
   comparing the extra coverage set to the incomplete coverage area and the remaining coverage area to provide a sufficiency list; and
   assigning a selected vehicle from among the vehicles based on the sufficiency list.

9. The method of claim 8, further comprising assigning the selected vehicle based on minimizing a time to complete the incomplete coverage area.

10. The method of claim 8, further comprising assigning the selected vehicle based on minimizing a time to complete the incomplete coverage area and the remaining coverage set.

11. The method of claim 8, further comprising assigning the selected vehicle based on minimizing a fuel consumption to complete the incomplete coverage area.

12. The method of claim 8, further comprising storing the sufficiency list in a sufficient list database module comprised in a memory module.

13. The method of claim 8, further comprising performing the incomplete task by the selected vehicle.

14. The method of claim 8, further comprising dividing the incomplete task into sub-tasks if the sufficiency list is empty.

15. The method of claim 14, further comprising allocating the sub-tasks to at least two selected vehicles from among the vehicles.

16. The method of claim 15, further comprising performing the sub-tasks by the at least two selected vehicles.

17. A non-transitory computer readable storage medium comprising computer-executable instructions for mission re-planning, the method executed by the computer-executable instructions comprising:
monitoring a plurality of vehicles in real-time;
detecting at least one incapacitated vehicle from among the vehicles that performs an incomplete task;
determining a remaining coverage set comprising a remaining coverage area for each of the vehicles;
calculating a travel distance from a task completion location of each of the vehicles to a stopped point of the at least one incapacitated vehicle to provide a travel set;
determining an extra coverage set based on the travel set and the remaining coverage set;
calculating an incomplete coverage area for the incomplete task;
comparing the extra coverage set to the incomplete coverage area and the remaining coverage area to provide a sufficiency list; and
assigning a selected vehicle from among the vehicles based on the sufficiency list.

18. The non-transitory computer readable storage medium of claim 17, further comprising computer-executable instructions for assigning the selected vehicle to complete the incomplete coverage area and the remaining coverage set based on minimizing one of: a fuel consumption, and a time.

19. The non-transitory computer readable storage medium of claim 17, further comprising computer-executable instructions for dividing the incomplete task into sub-tasks if the sufficiency list is empty.

20. The non-transitory computer readable storage medium of claim 17, further comprising computer-executable instructions for performing the incomplete task by the selected vehicle.

* * * * *